United States Patent Office 3,458,592
Patented July 29, 1969

3,458,592
MANUFACTURE OF n-MONO-OLEFINS FROM n-PARAFFINS
Charles A. Senn III, Nederland, and Levi C. Parker, Port Arthur, Tex., assignors to Texaco Inc., New York, N.Y., a corporation of Delaware
No Drawing. Filed Dec. 12, 1967, Ser. No. 689,790
Int. Cl. C07c 5/18; B01j 11/46
U.S. Cl. 260—683.3                             2 Claims

ABSTRACT OF THE DISCLOSURE

A method of preparing n-mono-olefins from n-paraffins by contacting n-paraffins with a crystalline metallic alumino-silicate molecular sieve of a uniform pore size of about 5 angstrom units having impregnated thereon between about 0.1 and 5 wt. percent of a platinum metal.

BACKGROUND OF INVENTION

Field of invention

The field of art to which this invention pertains is the conversion of hydrocarbons to olefins particularly wherein saturated hydrocarbons are dehydrogenated to form olefins.

Description of the prior art

In the past, olefins have been prepared from hydrocarbons by a variety of methods. One means utilized in the art is exemplified by U.S. 3,151,180 wherein corresponding olefins are manufactured from $C_6$ to $C_{20}$ paraffins by contacting said paraffins with a catalyst consisting of an alpha-alumina impregnated with a platinum metal under particular temperature, pressure and liquid space velocity conditions. The alumina carrier is taught to be critical in repressing the formation of aromatics. Although processes such as these do produce olefins, they do have the drawback of encouraging the production of a substantial amount of cracked product. To counteract the cracking tendency of platinum on alumina, processes have been developed such as U.S. 3,293,319 which poison standard platinum-alumina dehydrogenation catalyst with a combination of lithium and a material such as arsenic, antimony or bismuth. These poisons substantially suppress cracking of the saturated hydrocarbons as well as suppress isomerization reactions, thereby forming a substantial amount of corresponding olefins.

Hereinbefore and hereinafter by the term "corresponding olefin" or "corresponding alkene," it is intended to denote an n-olefin or n-alkene of the same chain length as the n-paraffin from which it is derived.

SUMMARY OF INVENTION

We have discovered, and this constitutes our invention, a novel catalytic method of converting straight chain n-paraffins (n-alkanes) to corresponding n-mono-olefins (n-alkenes), in the substantial absence of skeletal isomerization and the formation of undesired aromatic and cracked by-products. Further, we have discovered a method where high conversions to corresponding n-alkene can be obtained at temperatures which promote a rapid rate of reaction, yet result in a yield of corresponding n-alkene substantially over 90% of the total conversion product.

Specifically, the method of the invention comprises contacting an n-alkane of from 6 to 20 carbons with a crystalline metallic alumino-silicate zeolitic sieve of a uniform pore size of about 5A having impregnated thereon between about 0.1 and 5 wt. percent of a platinum metal under particular temperature, pressure and liquid space velocity conditions.

DETAILED DESCRIPTION OF THE INVENTION

In detail, the method of the invention comprises contacting a straight chain paraffin of from 6 to 20 carbons with a crystalline metallic alumino-silicate molecular sieve having impregnated thereon between about 0.1 and 5 wt. having a pore opening size of about 5 angstroms and percent, preferably between about 0.5 and 1 wt. percent, of a platinum metal selected from the group consisting of platinum, palladium and rhodium at a temperature between about 800 and 950° F., preferably between about 850 and 910° F., under a pressure of between about 0 and 200 p.s.i.g., preferably between about 10 and 60 p.s.i.g., utilizing a liquid space velocity of between about 0.5 and 10 LHSV (volumes reactant/hour/volume catalyst), preferably between about 2 and 6. Optionally, the contacting is conducted in the presence of hydrogen feed utilizing a mole ratio of hydrogen to alkane reactant of between about 0.5:1 and 15:1, the function of the hydrogen feed being to prolong catalyst life by suppressing the formation of carbonaceous deposits on the sieve base material. The hydrogen further functions to reduce any compounds of platinum on the sieve to the metal form.

The method is normally conducted in the vapor phase with the mono-olefin products being recovered from the reactor effluent by standard means such as selective extraction with solvents such as furfural and $SO_2$, selective extractive distillation, azeotropic distillation, molecular sieve adsorption, or chromatographic separation.

The reaction may be conducted in any standard type of vapor phase reactor which is packed with catalytic material. For small scale production, the reaction might be surrounded by a heating mechanism to maintain it at the desired temperature. In plant operations, the charge to the reactor (hydrocarbons plus hydrogen) would be heated to the desired temperature prior to entering the reactor. Since the reaction is endothermic, two or more reactors might be used in series, with reheat provided between the reactors.

Examples of the n-paraffin hydrocarbon reactants contemplated herein are n-hexane, n-octane, n-decane, n-undecane, n-dodecane, n-tridecane, n-tetradecane, n-hexadecane, n-octadecane and n-eicosane, and mixtures thereof. The n-alkenes resulting from the aforelisted n-paraffins are n-hexene, n-octene, n-decene, n-undecene, n-dodecene, n-tridecene, n-tetradecene, n-hexadecene, n-octadecene, and n-eicosene, and mixtures thereof respectively.

The molecular sieve base of the catalyst is often designated in the scientific and patent literature as a 5A sieve. The 5A sieve may be either a synthetic or natural zeolite of an average pore size of about 5 angstroms. The synthesis and detailed characterization of the A sieve is found in U.S. 2,882,243 and U.S. 3,311,190. In brief, the A sieve may be characterized by the general formula:

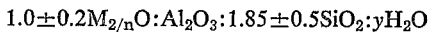

$$1.0 \pm 0.2 M_{2/n}O : Al_2O_3 : 1.85 \pm 0.5 SiO_2 : yH_2O$$

where M represents a metal, $n$ is its valence and $y$ may be any value up to 6 depending on M and the degree of crystal hydration.

Specifically, the molecular sieve bases suitable for use in the process of the invention are available commercially and may be produced in a number of ways. One suitable process for preparing such sieves involves the mixing of sodium silicate, preferably sodium metasilicate with sodium aluminate in water under carefully controlled conditions. The sodium silicate employed should be one having a ratio of soda to silica of between about 0.8 to 1 and about 2:1. Water glass and other sodium silicate solutions having a lower soda to silica ratio do not produce the selective absorbent crystals unless they are subjected to extended heat, soaking or crystallization periods. Sodium aluminate solutions having a ratio of soda to alumina in the range of from about 1:1 to about 3:1 may be employed. High soda to alumina ratios are preferred in the sodium aluminate. Solutions having soda to alumina ratios of about 1.5:1 have been found to be eminently satisfactory. The amounts of the sodium silicate and sodium aluminate solutions employed should be such that the ratio of silica to alumina in the final mixture ranges from about 0.8:1 to about 3:1, and preferably from about 1:1 to about 2:1.

These reactants are mixed in a manner to produce a precipitate having a uniform composition. A preferred method for combining them is to add the aluminate to the silicate at ambient temperatures using rapid and efficient agitation to produce a homogeneous mixture. The mixture is then heated to a temperature of from about 180° F. to about 210° F. and held at that temperature for a period of from about 0.5 to about 3 hours or longer. The crystals may be formed at lower temperatures but in that case longer reaction periods are required. At temperatures above about 250° F. a crystalline composition having a requisite uniform pore size opening is not obtained. During crystallization the pH of the solution should be maintained on the alkaline side, at about 12 or higher. At lower pH levels crystals having the desired uniform properties are not as readily formed.

Crystals prepared as described above have a pore diameter of about 4 angstrom units. To conver these crystals to those having 5 angstrom pores, it is necessary to employ base exchange reaction for the replacement to some of the sodium by calcium, magnesium, cobalt, nickel, iron or a similar material. Magnesium, cobalt, nickel and iron having a greater catalytic cracking activity than calcium are less preferred.

The base exchange reaction may be carried out by water washing the sodium alumino-silicate crystals and adding them to a solution containing the desired replacement ions. An aqueous solution of calcium chloride of about 20 wt. percent concentration, for example, may be used for preparing the calcium form of the 5A sieve. After a contact time which may range from about 5 minutes to about an hour the 5A product is filtered from the solution and washed free of exchanged liquids. About 50 to 75% of the sodium in the crystals is normally replaced during these base exchange reactions.

The crystals thus prepared are in a finely divided state and are usually pelleted with a suitable binder material before they are calcined in order to activate them. However, it is to be noted use of a binder material is optional and not mandatory. Any of a number of binder agents used in the manufacture of catalysts may be employed for this purpose. A binder consisting of bentonite, sodium silicate and water, for example, has been found satisfactory. In using this binder the constituents should be mixed so that the product contains from about 5 to about 10 wt. percent bentonite, 5 to 15 wt. percent sodium silicate and about 75 to 90 wt. percent of the crystals on a dry basis, the total mixture containing about 25% to 35% water. This mixture then may be extruded into pellets such as cylindrical pellets of between about $\frac{1}{32}$ and $\frac{1}{4}$ inch diameter and between about $\frac{1}{32}$ and $\frac{1}{4}$ inch length or otherwise shaped and subsequently dried and calcined. Calcination temperatures of from about 700 to about 900° F. or higher are satisfactory.

The thus prepared molecular sieve is impregnated by any one of a number of means. One such means calls for contacting the sieve with an aqueous or organic solution of the soluble metal compound such as, for example, chloroplatinic acid, platinum diamminodinitrite and palladium chloride under conditions of agitation and at ambient temperatures to insure uniform wetting, and then raising the temperature to approximately between about 100 and 200° F. for a period of time such as a half hour. The thus wetted catalyst is then removed from the solution and dried under preferably rising temperature conditions at a temperature, e.g., between about 180 and 900° F. for a period of time, e.g., between about 5 and 30 hours. As a result of this impregnation and heating, the platinum metal coats the molecular sieve including the interior of the sieve cages at least partially in the form of an oxide, this oxide being apparently developed during the calcining operation. If desired, the reduction of the platinum compound (oxide or otherwise) to the metal state on the molecular sieve may be accomplished prior to the catalyst's use by contacting the metallized sieve after calcining with hydrogen at a temperature between about 500 and 1000° F. for a period of time, e.g., between about 3 and 24 hours under hydrogen pressure of between about 0 and 500 p.s.i.g. Alternatively, the reduction can be accomplished in the situs of the dehydrogenation reaction when hydrogen is employed in the feed.

After operation as a dehydrogenation catalyst for a period of time, the catalyst may be regenerated by the following technique, namely, first purging the sieve with an inert gas, e.g., 60–70 cu. ft./hr. of nitrogen per liter of catalyst, while bringing the sieve to an elevated temperature, e.g., about 850–900° F., holding the catalyst at the elevated temperature for a period of time, e.g., about 5 hours to crack off hydrocarbon and convert the deposits to coke, then introducing air into the introgen stream at an initial concentration of less than 1 volume percent, e.g., 0.2 volume percent and increasing the air content in the nitrogen stream as necessary to maintain a burn wave in the reactor without exceeding 950° F. maximum temperature. After the burn wave has passed through the catalyst bed, the reactor is then purged with nitrogen leaving an essentially regenerated sieve.

It is to be noted the excellent results obtained from the use of a 5A molecular sieve base catalyst are surprising in view of the teachings of the art such as U.S. 3,294,858 which described the 5A sieve as an excellent catalytic cracking catalyst. We have unexpectedly found that when in combination with a platinum metal in the method of our invention, the metallized sieve does not exhibit cracking properties but surprisingly dehydrogenates the n-paraffin to the corresponding n-alkene with essentially no cracking, aromatization, isomerization, and other reforming and hydroforming type reactions.

The following examples further illustrate the invention but are not to be construed as limitations thereof.

Example I

This example illustrates the preparation of the catalyst.

To a 250 cc. graduate there was sequentially added 100 ccs. of distilled water and 2 grams of chloroplatinic acid ($H_2PtCl_6 \cdot 6H_2O$). To the graduate there was then added via slow pouring 100 grams of $\frac{1}{16}''$ extrudates of a Linde 5A molecular sieve having a uniform pore diameter of 5A units of the formula:

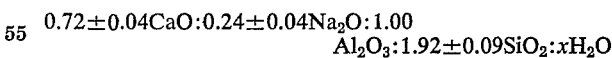

$0.72 \pm 0.04 CaO : 0.24 \pm 0.04 Na_2O : 1.00 Al_2O_3 : 1.92 \pm 0.09 SiO_2 : xH_2O$ where $x$ is less than about 6. Since the combination causes an exothermic reaction, the rate of pouring is adjusted to maintain the gas displacement and boiling under sufficient control to prevent loss of the catalyst and platinumizing material. At the end of the introduction of the 5A molecular sieve, the graduate is stoppered and tumbled for a period of 5–10 minutes to insure uniform wetting. The graduate is then placed in an oven and maintained at 150° F. for a period of 2 hours. The platinumized sieve is then separated from the liquid and placed in a drying dish and dried under the following sequential conditions:

| Hours | At, ° F. |
|---|---|
| 4 | 180 |
| 4 | 200 |
| 4 | 250 |
| 2 | 500 |
| 4 | 900 |

These exact times and temperatures are not critical. They merely serve as an illustrative example. One of the more important techniques is to hold the temperature below 210° F. for several hours to prevent loss of platinum due to high water vapor velocities. At the end of the drying period the platinumized catalyst is cooled in a desiccator and stored in an air-free container. A sample of the catalyst was analyzed and found to be a 5A sieve having impregnated thereon 0.40 wt. percent platinum.

Example II

This example illustrates the method of the invention and the criticality of the catalytic agent employed therein in producing corresponding n-alkenes from n-alkanes with substantially no undesired dehydrogenated, cyclized, isomerized and/or cracked by-products.

The catalyst employed in the method of the invention was of the type prepared in Example I.

In the comparative runs the following catalysts were employed:

Catalyst B: 0.9 wt. percent platinum impregnated on a 13X sodium alumino-silicate molecular sieve having a pore size of 10 angstroms and of the specific formula:

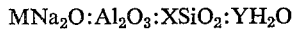
$$MNa_2O : Al_2O_3 : XSiO_2 : YH_2O$$

where M is about 0.85 and X and Y are respectively about 2.5 and 6.2. A further description of the X type sieve is found in U.S. 2,882,244 and U.S. 3,331,190. The platinumized 13X sieve catalyst was prepared by dissolving 1.4 grams of $H_2PtCl_6 \cdot 6H_2O$ in 50 ccs. of distilled water, and 50 grams of 13X sieve of $\frac{1}{16}''$ extrudate of 13X molecular sieve were placed in solution, under slow addition conditions to prevent excessive boiling. The resultant mixture was agitated and the excess solution was poured off and the catalyst was dried for 4 hours at 250° F. and then calcined for 6 hours at 900° F. Analysis of the platinumized 13X sieve found it to contain 0.9 wt. percent platinum.

Catalyst C: Platinum on a sodium Y molecular sieve catalyst was also prepared for a second comparative run. The Y sieve employed was a sodium alumino-silicate molecular sieve having an average pore diameter of 10 angstroms and the formula:

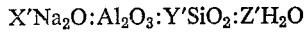
$$X'Na_2O : Al_2O_3 : Y'SiO_2 : Z'H_2O$$

where X' and Y' and Z' are respectively $0.9 \pm 0.2$, and 3–6 and $<9$. The Y sieves are more fully described in U.S. 3,130,007 and U.S. 3,331,190. The Y sieve employed was a $\frac{1}{16}''$ extrudate and the impregnated platinum catalyst therefrom was prepared by dissolving 2 grams of $H_2PtCl_6 \cdot 6H_2O$ in 100 ccs. of water and placing said chloroplatinic solution in a stoppered graduate and slowly introducing 100 grams of the Y molecular sieve (Linde SK–40) in the solution, the rate of introduction being tailored to prevent the loss of materials through boiling. The graduate was then stoppered and shaken for several minutes to insure uniform wetting. The excess solution was then poured off and the catalyst was dried successively at 150° F. for 2 hours, 180° F. for 4 hours, 200° F. for 4 hours, 250° F. for 4 hours, 500° F. for 2 hours and then was calcined at 900° F. for 4 hours. The test results on the catalyst showed that it contained 0.68 wt. percent platinum.

Catalyst D: A platinum on a gamma alumina base in the form of $\frac{1}{16}''$ spheres having a platinum content of 0.72 wt. percent, a fluorine content of about 0.35 wt. percent and a chlorine content of about 0.35 wt. percent was impregnated with 0.5 wt. percent lithium and 0.37 mole arsenic per mole of platinum. This catalyst is of the general type described in U.S. 3,293,319. The lithium and arsenic free platinum on alumina base catalyst is sold by Universal Oil Products Co. under the trade name R–8 Platinum Reforming Catalyst.

The n-paraffin reactant employed in Runs A and C was a 50:50 mixture of $C_{12}$–$C_{13}$ n-paraffin. In Run B the n-paraffin was $C_{10}$, and in Run D it was $C_{12}$. These charge stocks were selected basis their availability at the time of the experiments. The differences in charge stock composition would have no appreciable effect upon the performance of the catalysts. These stocks approximated 99 wt. percent n-paraffin purity. The non-normals were 1.0 wt. percent or less, and aromatic content was less than 0.1 wt. percent.

In the dehydrogenation operation the n-paraffin charge stock was pumped from a charge graduate through a line into which hydrogen was introduced and the resultant mixture was introduced into a preheater section prior to entering the reactor. The preheater and reactor tube was surrounded by a fluidized bed of silica-alumina heat transfer agent which in turn was surrounded by a metal shell container having heating elements in combination therewith. The reaction mixture was preheated to the desired temperature during its passage through approximately 60 inches of ¼ inch stainless steel pipe located in the fluidized bed. The mixture was then contacted in the reactor (approximately 16 inch length of 1" stainless steel pipe) housing from 100 to 200 ccs. of catalyst. The product was withdrawn from the reactor and passed to a cooler maintained at 50° F. and the gases were separated from the resultant condensate. The condensate was then passed on to a fractionator maintained at 250° F. to remove gases overhead and the liquid below was recovered as n-paraffin-n-olefin product. The recovered liquid was then analyzed via liquid and gas chromatography. The test data and results are reported below in table.

TABLE

| Run | A | B | C | D |
|---|---|---|---|---|
| Reactants: | | | | |
| Catalyst | 0.40% Pt 5A | 0.9% Pt 13X | 0.68% Pt NaY | 0.72% Pt Li-As-Al$_2$O$_3$ |
| n-Paraffin | $C_{12}$–$C_{13}$ | $C_{10}$ | $C_{12}$–$C_{13}$ | $C_{12}$ |
| Mole H$_2$/Mole hydrocarbon | 7.0 | 5.5 | 7.8 | 7.8 |
| Reaction conditions: | | | | |
| Temp., °F | 860 | 860 | 860 | 850 |
| Pressure, p.s.i.g. | 15 | 15 | 15 | 15 |
| Space Velocity,[1] V$_p$/V$_c$/hr | 2 | 2 | 2 | 2 |
| Hydrocarbon res. time, secs. | 1.32 | 1.22 | 1.22 | 1.18 |
| Hours on stream | 37–48 | 47–48 | 37–48 | 11–12 |
| Average product yield: | | | | |
| Charge n-alkane, wt. percent | 86.7 | 83.6 | 84.9 | 84.3 |
| "Corresponding" n-alkene, wt. percent | 12.6 | 12.9 | 10.6 | 12.1 |
| Cracked product, wt. percent | 0.5 | 0.2 | 1.3 | Trace |
| Isomers and cyclics | 0.2 | 3.3 | 3.2 | 3.6 |
| Selectivity,[2] mole percent | 96.1 | 79.8 | 70.6 | 78.2 |
| Conversion per pass, wt. percent | 13.3 | 16.4 | 15.1 | 15.7 |

[1] Space velocity in terms of liquid volumes of n-paraffin reactant (V$_p$)/solid volume of catalyst (V$_c$)/hour.
[2] Mole percent "Corresponding" n-alkene of total converted product.

As can be seen from the foregoing Run A, representative of the method of the invention and utilizing a catalyst system containing only 0.40% platinum, has a substantially higher selectivity and comparable or better conversion to the "corresponding" n-alkene than comparative Runs B, C and D which employ catalysts with substantially greater platinum contents.

Example III

This comparative example demonstrates the unexpected superiority of the method of the invention.

The procedure of Example II was essentially repeated in two runs wherein the 5A and 13X sieves of Example II without a platinum coating were employed as catalyst. A very low yield (0.8 vol. percent) of olefin was obtained for each sieve.

We claim:

1. A method for converting an n-alkane of from 6 to 20 carbons to its corresponding n-alkene comprising contacting said alkane in admixture with hydrogen with a catalyst consisting of a crystalline metallic alumino-silicate molecular sieve of the general formula:

$$1.0 \pm 0.2 M_{2/n}O : Al_2O_3 : 2.5 \pm 0.5 SiO_2 : XH_2O$$

where M is a metal, $n$ is its valence and X is a value up to 6 having uniform pore openings of about 5 angstrom units, and having impregnated thereon between about 0.1 and 5 wt. percent of platinum metal selected from the group consisting of platinum, palladium, ruthenium and rhodium, said contacting being conducted at a temperature between about 800 and 950° F. utilizing an LHSV space velocity in the range of between about 0.5 and 10 under a pressure of between about 0 and 200 p.s.i.g. and employing a mole ratio of hydrogen to paraffin in the range of between about 0.5:1 and 15:1.

2. A method in accordance with claim 1 wherein said n-paraffin is a mixture of dodecane and tridecane, said molecular sieve is characterized by the formula:

$$0.72 \pm 0.04 CaO : 0.24 \pm 0.04 Na_2O : 1.00 Al_2O_3 : 1.92 \pm 0.09 SiO_2 : XH_2O$$

where X is less than about 6 and said platinum metal is platinum.

References Cited

UNITED STATES PATENTS

| | | | |
|---|---|---|---|
| 3,140,252 | 7/1964 | Frilette et al. | 208—120 |
| 3,140,253 | 7/1964 | Plank et al. | 208—120 |
| 3,277,018 | 10/1966 | Plank et al. | 260—683.3 |
| 3,236,910 | 2/1966 | Bukata et al. | 260—683.3 |
| 3,293,319 | 12/1966 | Haensel et al. | 260—683.3 |
| 3,383,431 | 5/1968 | Fishel | 260—683.3 |

PAUL M. COUGHLAN, Jr., Primary Examiner

G. E. SCHMITKONS, Assistant Examiner

U.S. Cl. X.R.

252—455

UNITED STATES PATENT OFFICE
CERTIFICATE OF CORRECTION

Patent No. 3,458,592                              July 29, 1969

Charles A. Senn III et al.

It is certified that error appears in the above identified patent and that said Letters Patent are hereby corrected as shown below:

Column 2, lines 5 to 7, "having impregnated thereon between about 0.1 and 5 wt. having a pore opening size of about 5 angstroms and percent, preferably between about 0.5 and 1 wt. percent," should read -- having a pore opening size of about 5 Angstroms and having impregnated thereon between about 0.1 and 5 wt. %, preferably between about 0.5 and 1 wt. %, --. Column 3, line 27, "conver" should read -- convert --.

Signed and sealed this 9th day of June 1970.

(SEAL)

Attest:

Edward M. Fletcher, Jr.                      WILLIAM E. SCHUYLER, JR.

Attesting Officer                              Commissioner of Patents